(12) United States Patent
Nagahashi et al.

(10) Patent No.: US 11,879,359 B2
(45) Date of Patent: Jan. 23, 2024

(54) TRANSITION PIECE, COMBUSTOR, AND GAS TURBINE ENGINE

(71) Applicant: MITSUBISHI HEAVY INDUSTRIES, LTD., Tokyo (JP)

(72) Inventors: Hiroaki Nagahashi, Japan (JP); Yoshitaka Terada, Japan (JP); Shohei Numata, Japan (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/901,962

(22) Filed: Sep. 2, 2022

(65) Prior Publication Data
US 2023/0167747 A1 Jun. 1, 2023

(30) Foreign Application Priority Data
Sep. 30, 2021 (JP) .................................. 2021-160715

(51) Int. Cl.
*F01D 9/02* (2006.01)
*F23R 3/00* (2006.01)
(Continued)

(52) U.S. Cl.
CPC .............. *F01D 9/023* (2013.01); *F23R 3/002* (2013.01); *F02C 7/18* (2013.01); *F05D 2240/35* (2013.01);
(Continued)

(58) Field of Classification Search
CPC .. F01D 9/023; F23R 3/002; F23R 3/06; F23R 2900/03042; F23R 2900/03043; F02C 7/18; F05D 2240/35; F05D 2250/71
See application file for complete search history.

(56) References Cited

U.S. PATENT DOCUMENTS

| | | | |
|---|---|---|---|
| 6,282,905 B1* | 9/2001 | Sato | F23R 3/002 60/757 |
| 2005/0047907 A1* | 3/2005 | Nordlund | F02K 9/64 415/116 |

(Continued)

FOREIGN PATENT DOCUMENTS

| | | |
|---|---|---|
| JP | H03-30540 U | 3/1991 |
| JP | 201498352 A | 5/2014 |

(Continued)

OTHER PUBLICATIONS

Office Action dated May 9, 2023, issued in counterpart JP application No. 2021-160715, with English translation. (9 pages).

*Primary Examiner* — Gerald L Sung
*Assistant Examiner* — Rene D Ford
(74) *Attorney, Agent, or Firm* — WHDA, LLP (57) ABSTRACT

Provided is a transition piece including a first flow path group formed by arraying a plurality of in-wall flow paths that extend inside a plate material forming the transition piece and a second flow path group that is positioned on a side closer to a combustor liner than the first flow path group is. Each in-wall flow path in the first flow path group and the second flow path group has an inlet that is located at one end section in a flow direction of a combustion gas and that faces a compressed air main flow path, and an outlet that is located at the other end section in the flow direction of the combustion gas and that faces a combustion gas flow path. An installation area of the first flow path group and an installation area of the second flow path group partially overlap in the flow direction of the combustion gas by a predetermined overlap amount, and the overlap amount is set large for a portion where a shape change of the transition piece is relatively large, as compared with a portion where the shape change of the transition piece is relatively small.

7 Claims, 10 Drawing Sheets

(51) Int. Cl.
*F23R 3/06* (2006.01)
*F02C 7/18* (2006.01)

(52) U.S. Cl.
CPC ............ *F05D 2250/71* (2013.01); *F23R 3/06* (2013.01); *F23R 2900/03042* (2013.01); *F23R 2900/03043* (2013.01)

(56) References Cited

U.S. PATENT DOCUMENTS

| | | | | |
|---|---|---|---|---|
| 2012/0198854 A1* | 8/2012 | Schilp | ................ | F23R 3/06 60/755 |
| 2013/0098063 A1* | 4/2013 | Mizukami | ................ | F23R 3/06 60/785 |
| 2016/0047312 A1* | 2/2016 | Hase | ................ | F23R 3/005 60/806 |
| 2017/0370235 A1* | 12/2017 | Konishi | ................ | F23R 3/28 |
| 2018/0038594 A1* | 2/2018 | Shibata | ................ | F23R 3/06 |
| 2019/0048799 A1* | 2/2019 | Kishida | ................ | F23R 3/002 |
| 2022/0228530 A1* | 7/2022 | Kinoshita | ................ | F23R 3/002 |
| 2023/0094510 A1* | 3/2023 | Fujiwara | ................ | F01D 9/023 60/752 |
| 2023/0167747 A1* | 6/2023 | Nagahashi | ................ | F23R 3/005 60/752 |
| 2023/0175439 A1* | 6/2023 | Kinoshita | ................ | F23R 3/46 60/806 |

FOREIGN PATENT DOCUMENTS

| | | |
|---|---|---|
| JP | 2016-142163 A | 8/2016 |
| JP | 2017-524855 A | 8/2017 |

* cited by examiner

TRANSITION PIECE, COMBUSTOR, AND GAS TURBINE ENGINE

BACKGROUND OF THE INVENTION

1. Field of the Invention

The present invention relates to a transition piece, a combustor, and a gas turbine engine.

2. Description of the Related Art

A gas turbine engine combusts a fuel in combustors together with compressed air compressed in a compressor and drives a gas turbine by using the thus-generated combustion gas. A plurality of combustors are arranged in a circumferential direction of a casing of the gas turbine engine, and the combustion gas is supplied to the gas turbine through a transition piece formed of a metallic (alloy) plate material in a tubular form at each combustor.

Some transition pieces through which a high-temperature combustion gas having undergone a combustion reaction passes have, in their circumferential directions, a large number of in-wall flow paths that extend inside their constituent metallic plate materials and in a flow direction of the combustion gas (Patent Document 1, for example). Part of compressed air for combustion flows into the in-wall flow paths, and after cooling a transition piece, spouts out to an inner combustion gas flow path of the transition piece.

PRIOR ART DOCUMENT

Patent Document

Patent Document 1: JP-2014-98352-A

SUMMARY OF THE INVENTION

Because compressed air flowing through in-wall flow paths of a transition piece is heated as it advances through the in-wall flow paths, the cooling effect at downstream portions of the in-wall flow paths lowers if the length of each in-wall flow path is long. In view of this, for example, one possible solution to this is to divide the area of the transition piece into a plurality of areas in the flow direction of the combustion gas, and form in-wall flow paths in each area. The length of each in-wall flow path can thus be reduced, and the transition-piece cooling capability can be enhanced as a whole.

However, there is a substantial temperature difference between compressed air after being heated that has flowed through an in-wall flow path and spouts out to the inside of a transition piece and compressed air before being heated that flows into the in-wall flow path from the outside of the transition piece. Accordingly, there is a fear that temperature gradients of a plate material forming the transition piece increase in an area close to both an outlet of an in-wall flow path in an area located downstream (gas-turbine side) as seen in the flow direction of the combustion gas in the transition piece and an inlet of an in-wall flow path located upstream (combustor-liner side) as seen in the flow direction of the combustion gas in the transition piece. Additionally, a transition piece has a configuration in which its cross-sectional shape changes gradually from an inlet formed in a circular shape according to the shape of a combustor liner toward a square outlet. Different portions have significantly different curvatures, and differences in stress arise therebetween even under equivalent thermal conditions.

An object of the present invention is to provide a transition piece, a combustor, and a gas turbine engine that make it possible to extend the lifetime by reducing temperature gradients and stresses.

In order to achieve the object described above, the present invention provides a transition piece provided to a combustor that supplies a gas turbine with a combustion gas generated by combusting inside a combustor liner a fuel together with compressed air compressed in a compressor of a gas turbine engine, the transition piece connecting the combustor liner and the gas turbine and being formed of a plate material in a tubular form in such a manner that the transition piece separates an outer compressed air main flow path that supplies the compressed air from the compressor to the combustor and an inner combustion gas flow path that supplies the combustion gas from the combustor liner to the gas turbine from each other. The transition piece includes a first flow path group that is formed by arraying in a circumferential direction of the transition piece a plurality of in-wall flow paths that extend inside the plate material from a side closer to the gas turbine to a side closer to the combustor liner, and a second flow path group that is positioned on a side closer to the combustor liner than the first flow path group is and that is formed by arraying in the circumferential direction of the transition piece a plurality of in-wall flow paths that extend inside the plate material from the side closer to the gas turbine to the side closer to the combustor liner. Each in-wall flow path in the first flow path group and the second flow path group has an inlet that is located at one end section in a flow direction of the combustion gas and that faces the compressed air main flow path, and an outlet that is located at another end section in the flow direction of the combustion gas and that faces the combustion gas flow path. An installation area of the first flow path group and an installation area of the second flow path group partially overlap in the flow direction of the combustion gas by a predetermined overlap amount, and the overlap amount is set large for a portion where a shape change of the transition piece is relatively large, as compared with a portion where the shape change of the transition piece is relatively small.

According to the present invention, it is possible to extend the lifetime of a transition piece by reducing temperature gradients and stresses.

DESCRIPTION OF THE PREFERRED EMBODIMENTS

Embodiments of the present invention are explained below by using the figures.

First Embodiment

—Gas Turbine Engine—

Figure 1:
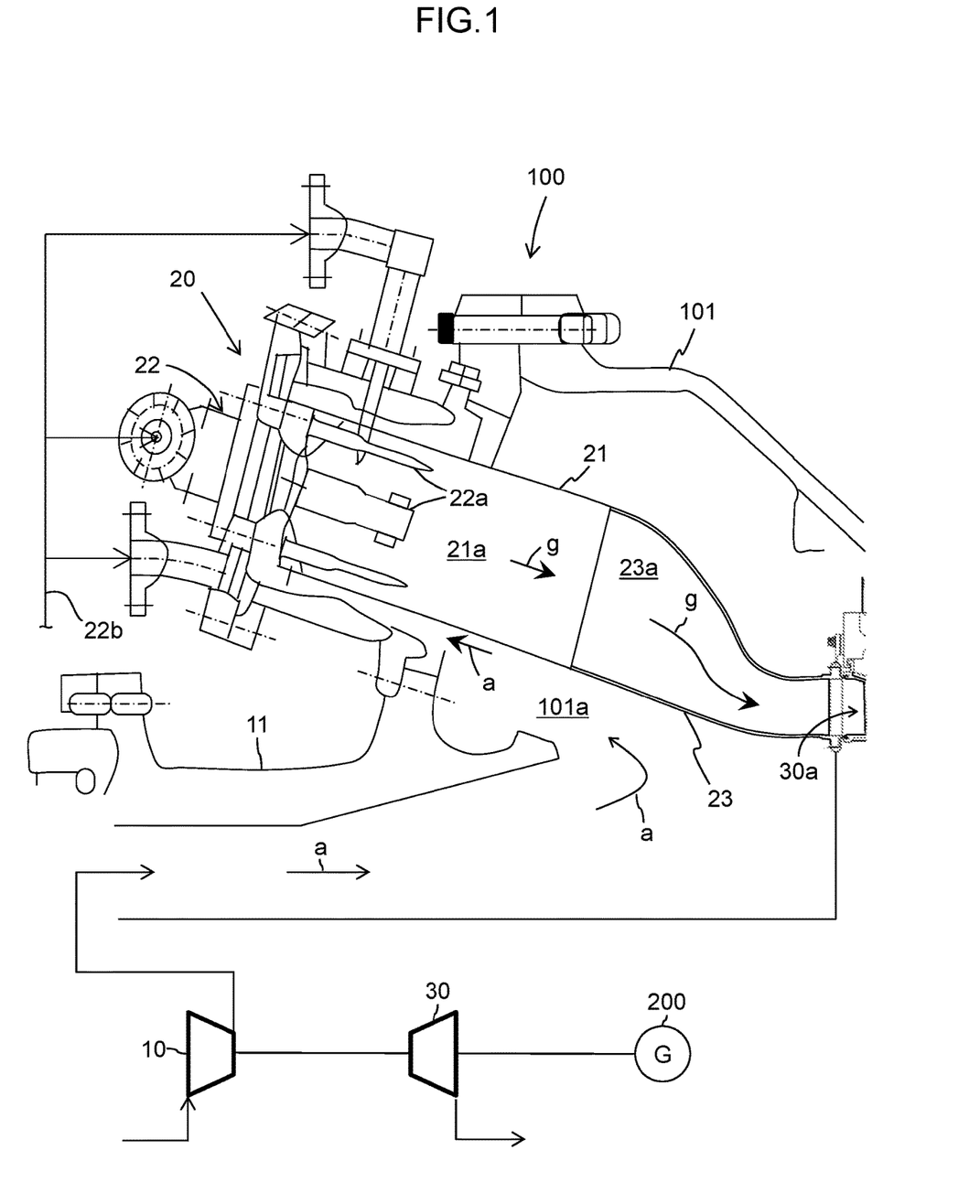
FIG. 1 is a schematic configuration diagram schematically depicting an example of a gas turbine plant including a transition piece according to a first embodiment of the present invention.

FIG. 1 is a schematic configuration diagram schematically depicting an example of a gas turbine plant including a transition piece according to a first embodiment of the present invention. The gas turbine plant depicted in the figure includes a gas turbine engine 100 and a load apparatus 200 driven by the gas turbine engine 100. A typical example of the load apparatus 200 is a generator, but instead of a generator, the load apparatus 200 may be a pump or a compressor (one that is different from a compressor 10 included in the gas turbine engine 100), and the compressor or pump may be driven by the gas turbine engine 100.

The gas turbine engine 100 is a prime mover that drives the load apparatus 200, and includes the compressor 10, a combustor 20, and a gas turbine 30. The compressor 10 is configured to suck in and compress air to generate high-temperature/high-pressure compressed air "a." The combustor 20 is configured to combust a fuel together with the compressed air "a" delivered from the compressor 10 via a diffuser 11 to generate a combustion gas "g." The gas turbine 30 is driven by the combustion gas "g" supplied from the combustor 20 and outputs rotational power. Axes of rotors of the gas turbine 30 and the compressor 10 are coupled to each other. Part of the output power of the gas turbine 30 is used as motive power of the compressor 10, and the remaining output power is used as motive power of the load apparatus 200. The combustion gas "g" having driven the gas turbine 30 is discharged as an exhaust gas via a discharge chamber (not depicted).

While the gas turbine engine 100 is a monoaxial gas turbine engine in the case illustrated in the present embodiment, the gas turbine engine 100 may be a biaxial gas turbine engine. In a case where a biaxial gas turbine engine is adopted, the gas turbine 30 includes a high-pressure turbine and a low-pressure turbine whose rotation shafts are separated from each other, the high-pressure turbine is coupled coaxially with the compressor 10, and the low-pressure turbine is coupled coaxially with the load apparatus 200.

—Combustor—

In a rotation direction of the gas turbine 30, a plurality of the combustors 20 are attached to a casing 101 of the gas turbine engine 100 (only one combustor 20 is representatively depicted in FIG. 1). Each combustor 20 includes a combustor liner 21, a burner 22, and a transition piece 23. The combustor 20 combusts, inside the combustor liner 21 (a combustion chamber 21a), a fuel that spouts out from the burner 22 together with the compressed air "a" compressed in the compressor 10 to generate the combustion gas "g," and supplies the combustion gas "g" to the gas turbine 30 via the transition piece 23.

The combustor liner 21 is a cylindrical member having the combustion chamber 21a formed therein and is installed inside the casing 101. The combustor liner 21 separates the compressed air "a" (i.e., a compressed air main flow path 101a outside the combustor liner 21) introduced into the casing 101 from the compressor 10 and the combustion gas "g" (i.e., the combustion chamber 21a inside the combustor liner 21) generated in the combustion chamber 21a from each other. An end section of the combustor liner 21 on the gas-turbine side (the right side in the figure) is inserted into the transition piece 23.

The burner 22 is a device that injects a fuel to the combustion chamber 21a via at least one fuel nozzle 22a, forms flames inside the combustion chamber 21a, and keeps the flames. The fuel nozzle 22a is supplied with the fuel from a fuel source (e.g., a fuel tank) via a fuel system (fuel pipe) 22b.

Next, a configuration of the transition piece 23 is explained.

—Transition Piece—

Figure 2:
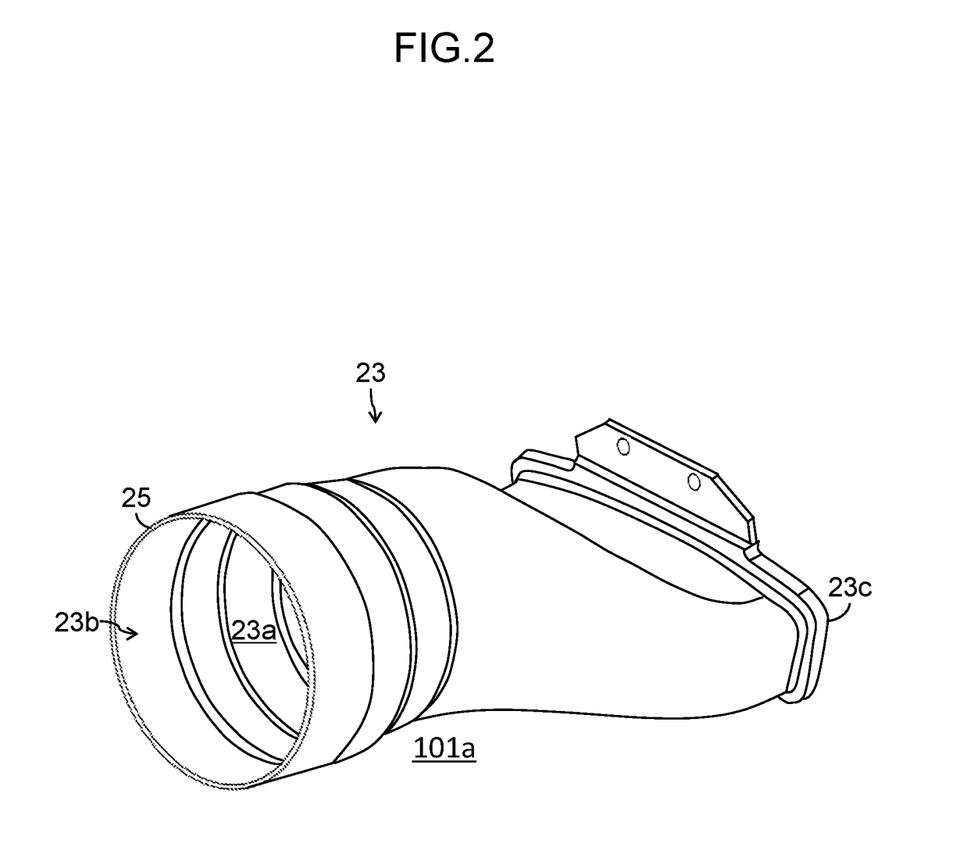
FIG. 2 is a perspective view of the transition piece according to the first embodiment of the present invention.
Figure 3:
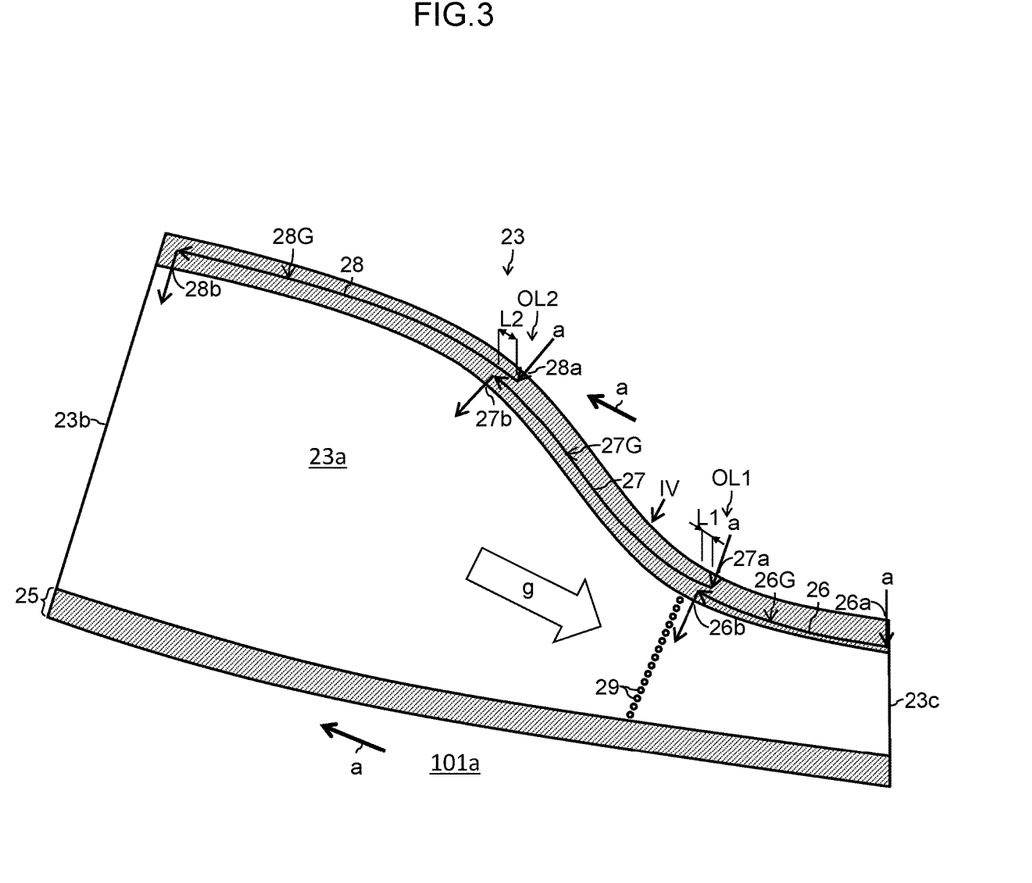
FIG. 3 is a schematic view of a cross section of the transition piece according to the first embodiment of the present invention, taken along a plane passing through a center line of a gas turbine.

FIG. 2 is a perspective view of the transition piece, and FIG. 3 is a schematic view of a cross section of the transition piece, taken along a plane passing through a center line of the gas turbine 30. It should be noted that in-wall flow paths 26 to 28 mentioned later and dilution holes 29 (mentioned later) are omitted in FIG. 2.

The transition piece 23 is a member that introduces the combustion gas "g" generated in the combustion chamber 21a to the gas turbine 30, connects the combustor liner 21 and the gas turbine 30, and also is formed of a metallic (alloy) plate material (transition piece panel) 25 in a tubular form. The transition piece 23 separates the outer compressed air main flow path 101a, through which the compressed air "a" supplied from the compressor 10 to the burner 22 of the combustor 20 flows, and an inner combustion gas flow path 23a, through which the combustion gas "g" supplied from the combustor liner 21 to the gas turbine 30 flows, from each other. As mentioned earlier, the combustor liner 21 is inserted into an end section of the transition piece 23 on the combustor-liner side, that is, an inlet 23b for the combustion gas "g." An end section of the transition piece 23 on the gas-turbine side, that is, an outlet 23c for the combustion gas "g," faces an inlet 30a (FIG. 1) of the gas turbine 30. An annular working fluid flow path that stationary blades (not depicted) and moving blades (not depicted) in the gas turbine 30 face is supplied with the combustion gas "g" from the outlet 23c of the transition piece 23.

The inlet 23b of the transition piece 23 is formed in a circular shape as depicted in FIG. 2 according to the outlet shape of the cylindrical combustor liner 21 (FIG. 1). Meanwhile, the outlet 23c of the transition piece 23 is formed in a square shape according to a shape formed by dividing the inlet 30a of the annular working fluid flow path of the gas turbine 30 equally in the rotation direction of the gas turbine 30 into the number of the outlets 23c of the transition pieces 23 of the combustors 20. The outlets 23c of the transition pieces 23 of the plurality of combustors 20 included in the gas turbine engine 100 lie next to each other in the rotation direction of the gas turbine 30 to form an annular shape according to the shape of the inlet 30a of the gas turbine 30. Accordingly, the transition pieces 23 each have a cross-sectional shape that changes gradually from the circular inlet 23b toward the square outlet 23c, and different portions of the plate material 25 forming the transition piece 23 have different curvatures.

Figure 8:
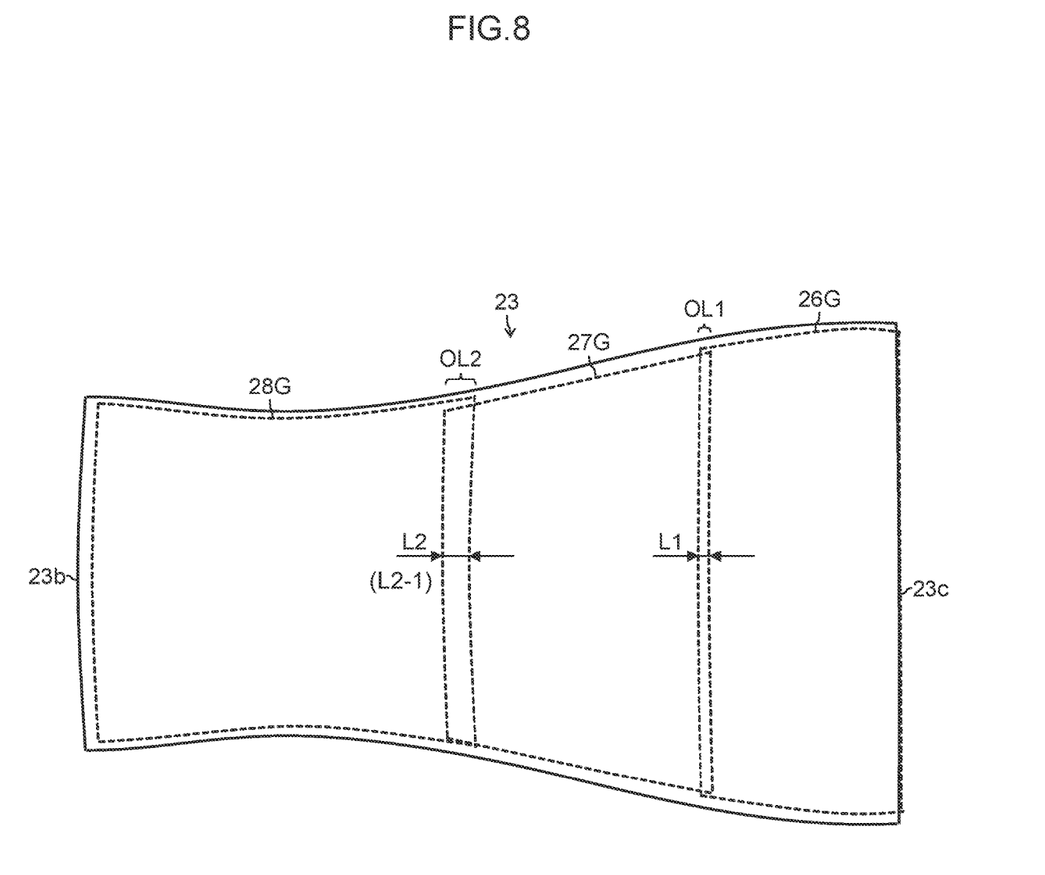
FIG. 8 is a schematic view depicting installation areas of in-wall flow paths of a top side section of the transition piece according to the first embodiment of the present invention.

For example, when the transition piece 23 is seen from a top side, the width of the transition piece 23 (dimension in the rotation direction of the gas turbine 30) changes from the inlet 23b toward the outlet 23c, and the width of the outlet 23c is wider than the width of the inlet 23b (FIG. 8). Meanwhile, when the transition piece 23 is seen from a lateral side, the width of the transition piece 23 (dimension in a radial direction of the gas turbine 30) decreases from the inlet 23b toward the outlet 23c (FIG. 3). In this manner, the curvature of the plate material 25 forming the transition piece 23 is different depending on the position in the flow direction of the combustion gas "g" and, further, on the position in a circumferential direction of the transition piece 23. The shape of the transition piece 23 is a smooth shape for its role of introducing the combustion gas "g" but is a complicated shape in this manner.

Note that the top side of the transition piece 23 is an outer side of the transition piece 23 in the radial direction of the gas turbine 30. Accordingly, an inner side of the transition piece 23 in the radial direction of the gas turbine 30 is a bottom side of the transition piece 23. In addition, seeing the transition piece 23 from the lateral side means seeing the transition piece 23 in a direction along the rotation direction of the gas turbine 30.

In the present embodiment, each transition piece 23 includes a plurality of in-wall flow paths 26 to 28 and a plurality of dilution holes 29 as depicted in FIG. 3. Note that, while one annular line of the dilution holes 29 is arranged in the circumferential direction of the transition piece 23 in the example depicted in the figure, there may be a plurality of lines of dilution holes 29. An appropriate number is selected as the number of lines from the viewpoint of combustion stability. These in-wall flow paths 26 to 28 and dilution holes 29 are explained below in order.

—In-Wall Flow Paths—

Figure 4:
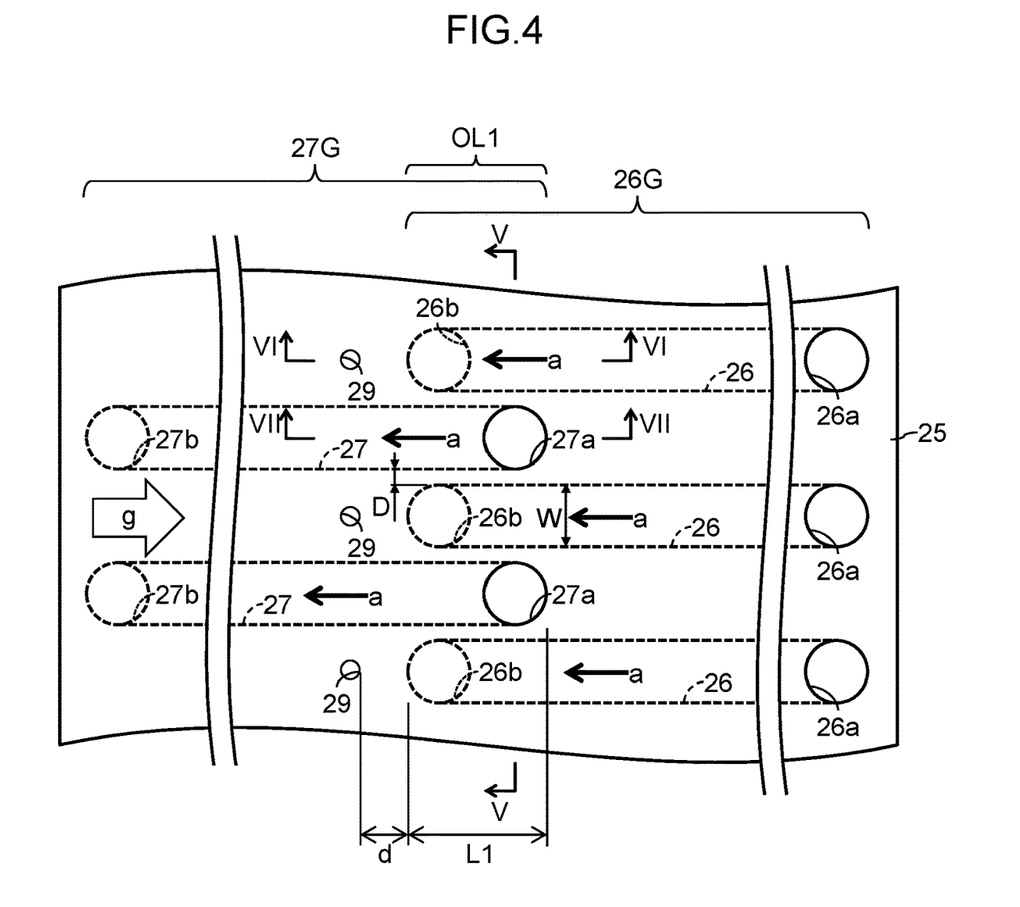
FIG. 4 is an arrow view schematically depicting part of an outer circumferential surface of the transition piece according to the first embodiment of the present invention, as seen in a direction of arrow IV in FIG. 3.
Figure 5:
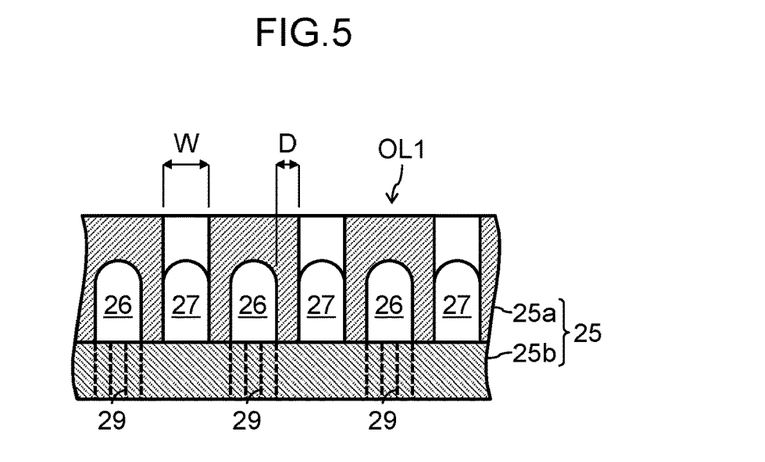
FIG. 5 is an arrow cross-sectional view taken along line V-V in FIG. 4.
Figure 6:
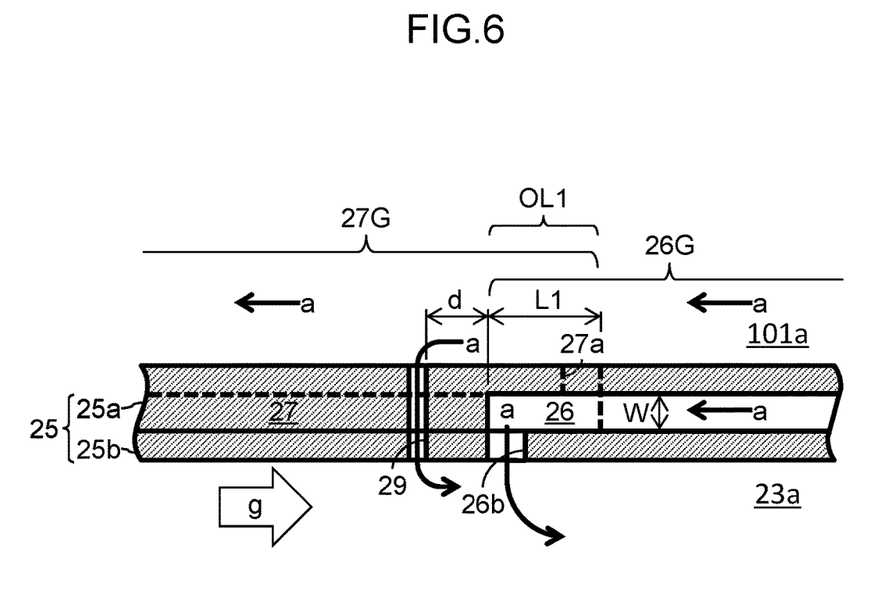
FIG. 6 is an arrow cross-sectional view taken along line VI-VI in FIG. 4.
Figure 7:
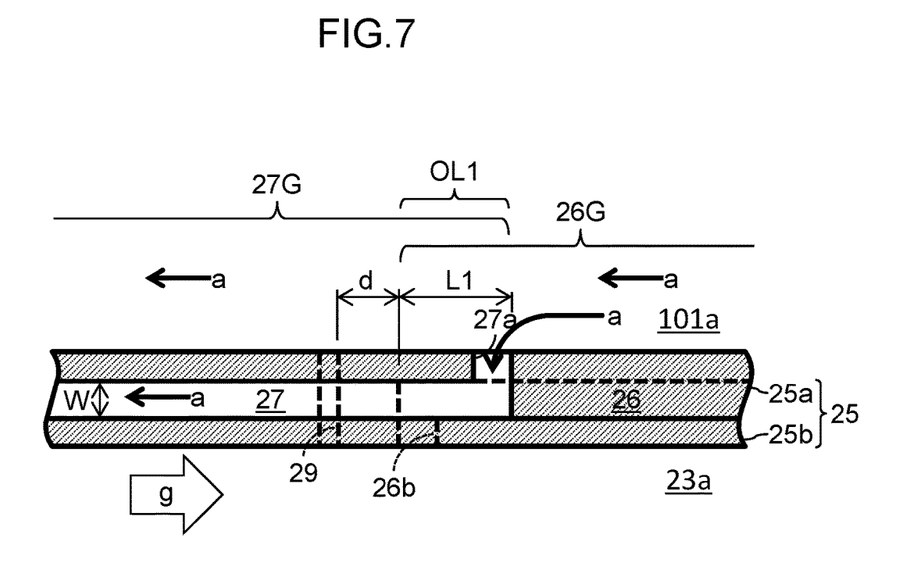
FIG. 7 is an arrow cross-sectional view taken along line VII-VII in FIG. 4.
Figure 9:
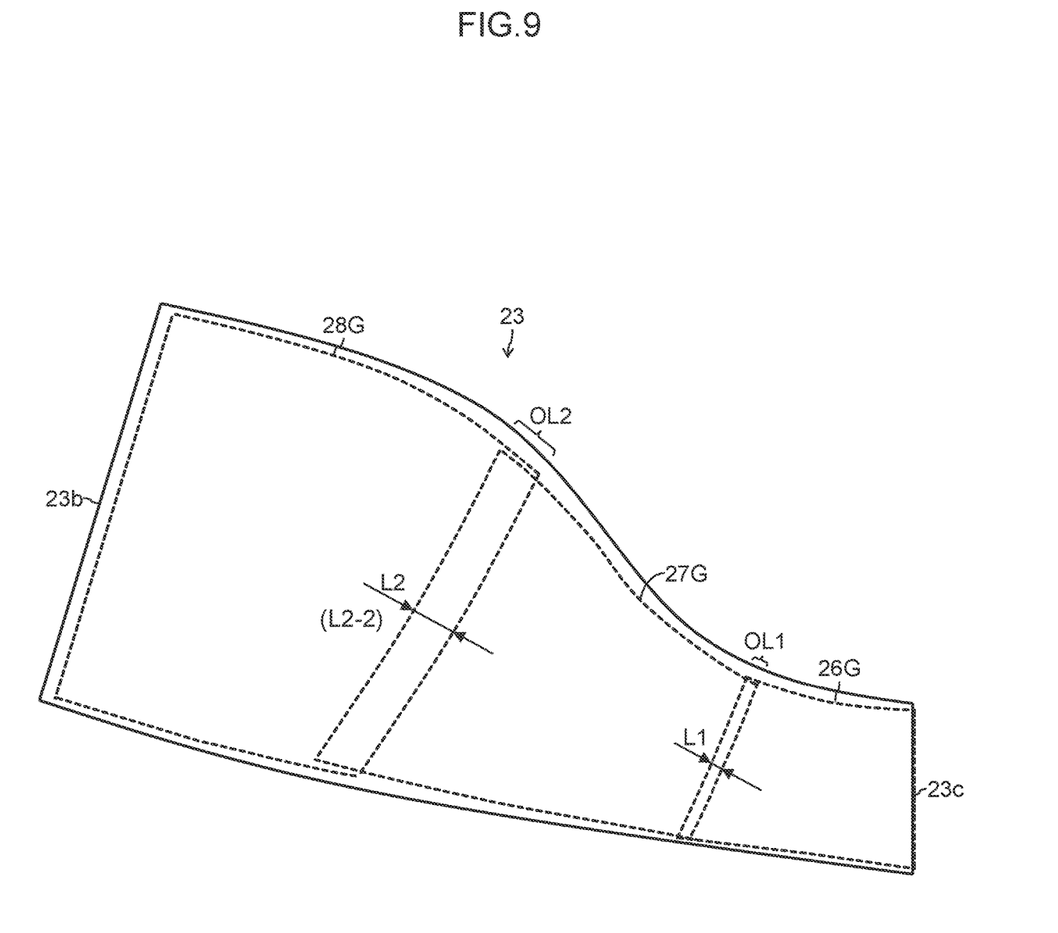
FIG. 9 is a schematic view depicting installation areas of in-wall flow paths of a lateral side section of the transition piece according to the first embodiment of the present invention.
Figure 10:
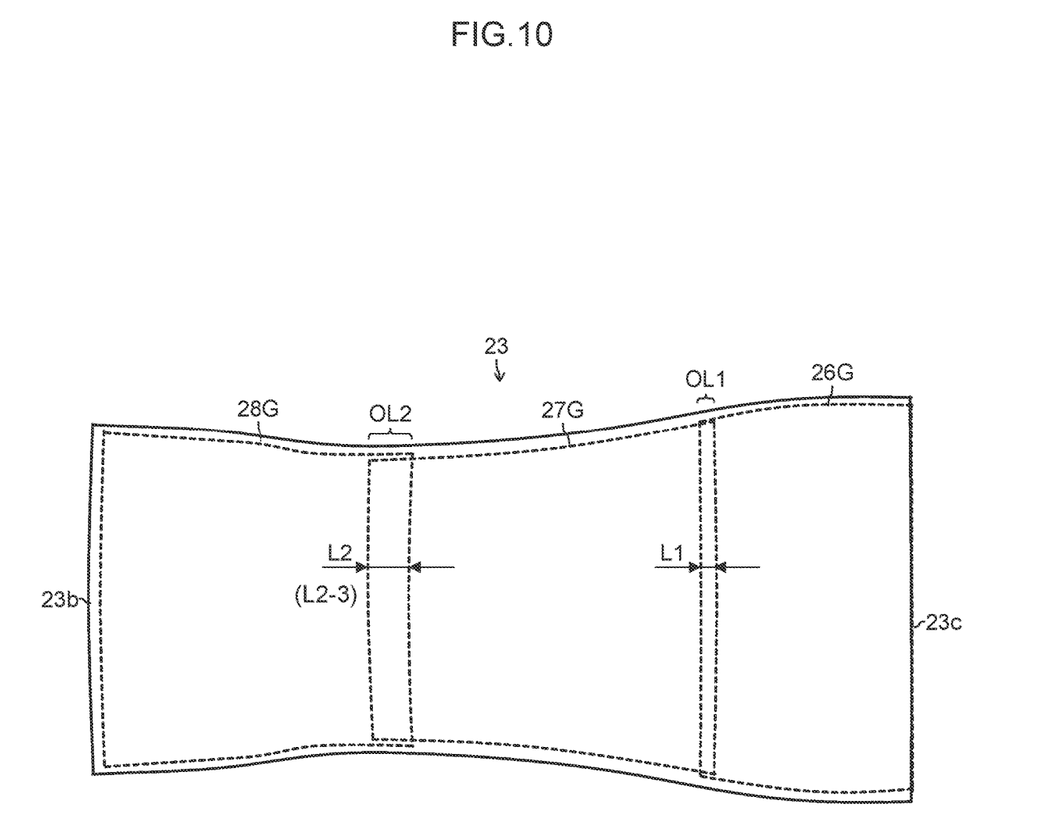
FIG. 10 is a schematic view depicting installation areas of in-wall flow paths of a bottom side section of the transition piece according to the first embodiment of the present invention.

FIG. 4 is an arrow view schematically depicting part of an outer circumferential surface of the transition piece as seen in a direction of arrow IV in FIG. 3, FIG. 5 is an arrow cross-sectional view taken along line V-V in FIG. 4, FIG. 6 is an arrow cross-sectional view taken along line VI-VI in FIG. 4, and FIG. 7 is an arrow cross-sectional view taken along line VII-VII in FIG. 4. FIG. 8 is a schematic view depicting installation areas of in-wall flow paths of a top side section of the transition piece. FIG. 9 is a schematic view depicting installation areas of in-wall flow paths of a lateral side section of the transition piece. FIG. 10 is a schematic view depicting installation areas of in-wall flow paths of a bottom side section of the transition piece.

The transition piece 23 includes a first flow path group 26G, a second flow path group 27G, and a third flow path group 28G. The first flow path group 26G is a set of flow paths that is formed by annularly arraying a large number of in-wall flow paths 26 in the circumferential direction of the transition piece 23, and surrounds the entire circumference of the transition piece 23. Similarly, the second flow path group 27G and the third flow path group 28G are respective sets of a large number of in-wall flow paths 27 and 28 and surround the entire circumference of the transition piece 23. The first flow path group 26G is positioned in an area located on the downstream side in the flow direction of the combustion gas "g," that is, on a side closer to the gas turbine 30, in the transition piece 23. The second flow path group 27G is positioned in a middle area in the flow direction of the combustion gas "g" in the transition piece 23 and is positioned on a side closer to the combustor liner 21 than the first flow path group 26G is. The third flow path group 28G is a flow path group positioned at the most upstream position in the flow direction of the combustion gas "g" and is positioned on a side closer to the combustor liner 21 than the second flow path group 27G is. The in-wall flow paths (the in-wall flow paths 26 and 27, the in-wall flow paths 27 and 28) in the first flow path group 26G, the second flow path group 27G, and the third flow path group 28G do not communicate with each other and are independent of each other.

The in-wall flow paths 26 to 28 extend inside the plate material 25 (inside its plate thickness) forming the transition piece 23 from the side closer to the gas turbine 30 to the side closer to the combustor liner 21, that is, along the flow direction of the combustion gas "g." In the first flow path group 26G, lengths of in-wall flow paths 26 that are adjacent to each other in the circumferential direction of the transition piece 23 are substantially the same. Similarly, in the second flow path group 27G and the third flow path group 28G, lengths of in-wall flow paths 27 and 28 that are adjacent to each other in the circumferential direction of the transition piece 23 are substantially the same.

Here, the plate material 25 forming the transition piece 23 includes an outer plate 25a and an inner plate 25b that are pasted together. The outer plate 25a faces the compressed air main flow path 101a as depicted in FIG. 5, and the inner plate 25b faces the combustion gas flow path 23a. The in-wall flow paths 26 to 28 are configured as flow paths passing through the inside of the plate material 25, by forming slits on an inner surface of the outer plate 25a and pasting the inner plate 25b on the inner surface of the outer plate 25a to close the slits. Alternatively, slits may be provided on the inner plate 25b. While in-wall flow paths 26 that are adjacent to each other in the circumferential direction of the transition piece 23 do not communicate with each other in the present embodiment, alternatively, adjacent in-wall flow paths 26 may communicate with each other at one location or a plurality of locations if it is necessary for reducing flow rate deviations, for example. The same applies also to in-wall flow paths 27 and 28.

Each in-wall flow path 26 in the first flow path group 26G includes one inlet 26a and one outlet 26b for the compressed air "a" (FIG. 3 and FIG. 4). The inlet 26a is provided through the outer plate 25a of the plate material 25, faces the compressed air main flow path 101a, penetrates the outer plate 25a in the plate thickness direction, and establishes communication between the compressed air main flow path 101a and the in-wall flow path 26. The outlet 26b is provided through the inner plate 25b of the plate material 25, faces the combustion gas flow path 23a, penetrates the inner plate 25b in the plate thickness direction, and establishes communication between the combustion gas flow path 23a and the in-wall flow path 26. Due to a differential pressure generated between the inlet 26a and the outlet 26b during operation of the gas turbine engine 100, part of the compressed air "a" flows into each in-wall flow path 26 as cooling air from the compressed air main flow path 101a and spouts out to the combustion gas flow path 23a. The part of the compressed air "a" flowing through the in-wall flow path 26 bypassing the burner 22 (FIG. 1) in this manner cools the transition piece 23.

Note that the inlet 26a is connected to one end section of the in-wall flow path 26 in the flow direction of the combustion gas "g," and the outlet 26b is connected to the other end section of the in-wall flow path 26 in the flow direction of the combustion gas "g." Specifically, each in-wall flow path 26 is provided with the inlet 26a at an end section on the side closer to the gas turbine 30 and the outlet 26b at an end section on the side closer to the combustor liner 21, and each in-wall flow path 26 is configured in such a manner that the compressed air "a" flows therethrough in a direction opposite to the flow direction of the combustion gas "g."

Each in-wall flow path 27 in the second flow path group 27G has a configuration similar to that of the in-wall flow path 26, and includes one inlet 27a and one outlet 27b (FIG. 3 and FIG. 4). Each in-wall flow path 28 in the third flow path group 28G similarly includes one inlet 28a and one outlet 28b (FIG. 3). In the present embodiment, the arrangement of the outlets and inlets of the in-wall flow paths 27 and 28 is similar to that of the in-wall flow path 26, and the compressed air "a" flows through the in-wall flow paths 27 and 28 in the direction opposite to the combustion gas "g."

As depicted in FIG. 3 to FIG. 10, an installation area of the first flow path group 26G and an installation area of the second flow path group 27G partially overlap in the flow direction of the combustion gas "g" (in a direction from the combustor liner 21 toward the gas turbine 30) by a predetermined overlap amount L1. Specifically, one end of an in-wall flow path 26 in the first flow path group 26G is interposed between adjacent in-wall flow paths 27 in the second flow path group 27G, and a strip-like overlap section OL1 in which the first flow path group 26G and the second flow path group 27G overlap is formed. The overlap section OL1 surrounds the entire circumference of the transition piece 23.

Similarly, the installation area of the second flow path group 27G and an installation area of the third flow path group 28G also partially overlap in the flow direction of the combustion gas "g" by a predetermined overlap amount L2. Specifically, one end of an in-wall flow path 27 in the second flow path group 27G is interposed between adjacent in-wall flow paths 28 in the third flow path group 28G, and a strip-like overlap section OL2 in which the second flow path group 27G and the third flow path group 28G overlap is formed. The overlap section OL2 also surrounds the entire circumference of the transition piece 23.

Note that the in-wall flow paths 26 to 28 are arranged densely. An interval D between two in-wall flow paths 26 and 27 that are adjacent to each other in the circumferential direction of the transition piece 23 in the overlap section OL1 is set to an interval which is the same as or smaller than a diameter W of circular cross sections of the in-wall flow paths 26 and 27 in the configuration illustrated in the present embodiment (FIG. 4 and FIG. 5). Similarly, an interval D between two in-wall flow paths 27 and 28 that are adjacent to each other in the circumferential direction of the transition piece 23 in the overlap section OL2 is also set to an interval which is the same as or smaller than a diameter W of circular cross sections of the in-wall flow paths 27 and 28.

The overlap amounts L1 and L2 mentioned above are set large for portions where a shape change of the transition piece 23 is relatively large, as compared with those for portions where a shape change of the transition piece 23 is relatively small. The shape change of the transition piece 23 mentioned here is, for example, a curvature of the plate material 25 forming the transition piece 23, a cross-sectional area size change rate of the transition piece 23, or a width change rate of the transition piece 23. The cross-sectional area size change rate of the transition piece 23 is a rate of change in area size of a cross section of the transition piece 23, which cross section is orthogonal to a center line of the combustion gas flow path 23a, according to a change in position along the center line of the combustion gas flow path 23a. The width change rate of the transition piece 23 is a rate of change in dimension of the transition piece 23 measured in the rotation direction or radial direction of the gas turbine 30, according to a change in position along the center line of the combustion gas flow path 23a. For example, the overlap amount L2 partially differs depending on the circumferential position of the transition piece 23, and the overlap amount L2 is larger on the lateral side (L2-2) and the bottom side (L2-3) of the transition piece 23 than on the top side fL2-1) in the present embodiment (FIG. 8 to FIG. 10). For example, differences of the overlap amount L2 depending on the circumferential position correspond to differences of the shape change of the transition piece 23 at each position, and the larger overlap amount L2 (L2-3) is substantially twice as large as the smaller overlap amount L2 (L2-1) in the example depicted in FIG. 8 to FIG. 10. The overlap amount L1 can similarly have different values depending on the circumferential position but is made generally constant regardless of the circumferential position of the transition piece 23 in the present embodiment.

In addition, in the present embodiment, with respect to an identical circumferential position, the overlap amount L2 of the second flow path group 27G and third flow path group 28G is partially different from the overlap amount L1 of the first flow path group 26G and second flow path group 27G. Specifically, the overlap amount L2 is made larger than the overlap amount L1 on the lateral side and the bottom side of the transition piece 23 (FIG. 9, FIG. 10). For example, differences of the overlap amounts L1 and L2 correspond to differences of the shape change of the transition piece 23 at each position, and the larger overlap amount L2 is substantially twice as large as the smaller overlap amount L1 in the example depicted in FIG. 9 and FIG. 10. The overlap amounts L1 and L2 can also have a difference on the top side of the transition piece 23, but the overlap amounts L1 and L2 are substantially the same on the top side in the present embodiment.

—Dilution Holes—

The plurality of dilution holes 29 described above are small holes penetrating the plate material 25 forming the transition piece 23 and establishing communication between the compressed air main flow path 101a and the combustion gas flow path 23a, and their opening diameters are substantially the same as or smaller than those of the outlets 26b to 28b of the in-wall flow paths 26 to 28. Each of these dilution holes 29 is positioned in a space between in-wall flow paths 27 in the second flow path group 27G that are adjacent to each other in the circumferential direction of the transition piece 23, and is positioned closer to the inlets 27a of the in-wall flow paths 27 in the second flow path group 27G than to the outlets 27b of the in-wall flow paths 27 in the second flow path group 27G. In this manner, the dilution holes 29 are provided along the overlap section OL1 to alternate with in-wall flow paths 27 in an amount substantially the same as the number of the in-wall flow paths 26 or 27, and form an annular line that surrounds the entire circumference of the transition piece 23.

A distance d between the outlet 26b of an in-wall flow path 26 and the dilution hole 29 closest to it is the same as or smaller than the diameter W of the circular cross sections of the in-wall flow paths 26 to 28 (FIG. 4). The distance d between the outlet 26b and the dilution hole 29 is smaller than at least the maximum value of the overlap amount L1 of the first flow path group 26G and the second flow path group 27G. For example, the distance d is approximately 10 mm.

In addition, portions of the transition piece 23 where the dilution holes 29 are provided are at positions where the shape change of the transition piece 23 is relatively large (e.g., where the shape change is larger than an average value of shape changes of all sections of the transition piece 23). As mentioned before, the shape change means, for example, the curvature of the plate material 25 forming the transition piece 23, the cross-sectional area size change rate of the transition piece 23, or the width change rate of the transition piece 23. In the transition piece 23 whose dimension as measured in the radial direction (or rotation direction) of the gas turbine 30 changes toward the gas turbine 30, portions where such a dimensional change assumes a local maximum or portions around those portions are examples of suitable positions of the dilution holes 29.

—Operation—

During operation of the gas turbine engine 100, air is taken into the compressor 10, compressed, and delivered as the high-pressure compressed air "a" from the compressor 10 to the compressed air main flow path 101a via the diffuser 11. The compressed air "a" delivered to the compressed air main flow path 101a is supplied to the burner 22, spouts out to the combustion chamber 21a together with a fuel supplied from the fuel system 22b (FIG. 1), and is combusted. The high-temperature combustion gas "g" generated in the combustion chamber 21a is thus supplied to the gas turbine 30 via the transition piece 23 and drives the gas turbine 30. Then, the rotational output power of the gas turbine 30 drives the load apparatus 200.

Meanwhile, part of the compressed air "a" that flows from the compressed air main flow path 101a toward the burner 22 bypasses the burner 22 and flows into the in-wall flow paths 26 to 28 via the inlets 26a to 28a. The compressed air "a" having flowed into the in-wall flow paths 26 to 28 flows through the in-wall flow paths 26 to 28, cools the transition piece 23, spouts out to the inner combustion gas flow path 23a of the transition piece 23, and merges with the combustion gas "g." In addition, another part of the compressed air "a" in the compressed air main flow path 101a bypasses the burner 22 and spouts out to the inside of the transition piece 23 via the dilution holes 29. The compressed air "a" having spouted out via the large number of dilution holes 29, which are small holes, forms a film cooling membrane along an inner wall surface of the transition piece 23 flows toward the gas turbine 30, to thereby protect the plate material 25 of the transition piece 23 from heat of the combustion gas "g."

—Effects—

(1) In the present embodiment, a large number of in-wall flow paths 26 to 28 are provided to the transition piece 23, the compressed air "a" is caused to flow as cooling air to the plate material 25 forming the transition piece 23, and the transition piece 23 through which the high-temperature combustion gas "g" passes can be cooled effectively. At this time, since the compressed air "a" is heated as it flows through the in-wall flow paths 26 to 28, if each in-wall flow path extends from one end to the other end of the transition piece 23, the temperature of the compressed air "a" increases at and around the outlet of the in-wall flow path because the in-wall flow path is long, so that the cooling effect lowers.

In view of this, in the present embodiment, the transition piece 23 is divided into a plurality of areas in the flow direction of the combustion gas "g," and an independent flow path group is formed in each area to reduce the length of each in-wall flow path. The temperature of the compressed air "a" at and around the outlet of each of the in-wall flow paths 26 to 28 can thus be kept low, and the effect of cooling the transition piece 23 can be enhanced.

However, there is a temperature difference between the compressed air "a" spouting out from the outlet 26b of an in-wall flow path 26 in the first flow path group 26G and the compressed air "a" flowing into the inlet 27a of an in-wall flow path 27 in the second flow path group 27G. Accordingly, temperature gradients are generated in the flow direction of the combustion gas "g" in the plate material 25 at and around the outlets 26b and the inlets 27a, and this can increase stress concentration resulting from the presence of the outlets 26b. In view of this, a partial overlapping portion is created between the installation area of the first flow path group 26G and the installation area of the second flow path group 27G, and an increase of stresses at and around the outlets 26b and the inlets 27a can be reduced by ensuring that there are intervals between the outlets 26b and the inlets 27a. The same applies also to an overlapping structure between the second flow path group 27G and the third flow path group 28G.

Particularly, in the present embodiment, the overlap amounts L1 and L2 are set larger for portions where the shape change of the transition piece 23 is relatively large than those for portions where the shape change of the transition piece 23 is relatively small. At the portions with large shape changes which are particularly disadvantageous in terms of strength, therefore, it is possible to ensure that the inlets 27a and 28a where the relatively low-temperature compressed air "a" flows in and the outlets 26b and 27b where the relatively high-temperature compressed air "a" spouts out are distanced from each other. Therefore, temperature gradients and stress concentration at sections surrounding the outlets 26b and 27b of the in-wall flow paths 26 and 27 can be reduced as a whole, and the lifetime of the transition piece 23 can be extended.

(2) In addition, if the rate of supply of the compressed air "a" to the burner 22 becomes excessively high under an operation condition with a low fuel supply rate, there is a fear that the combustion temperature lowers and the combustion stability is impaired. In view of this, in the present embodiment, it is possible to attempt to enhance the combustion stability by causing part of the compressed air "a" to bypass the burner 22 via the large number of small-diameter dilution holes 29 and supplying the part of the compressed air "a" to an area which is in the inner combustion gas flow path 23a of the transition piece 23 and where combustion reactions have been completed.

However, the transition piece 23 is used in a thermally severe environment because the high-temperature combustion gas "g" having undergone combustion reactions in the combustion chamber 21a passes therethrough. Moreover, stresses easily increase shape-wise also because its shape changes from the circular cross section to the square cross section. In a case where the dilution holes 29 are provided to the transition piece 23, stresses can be concentrated around the dilution holes 29.

In view of this, in the present embodiment, in each space between in-wall flow paths 27 in the second flow path group 27G that are adjacent to each other in the circumferential direction, a dilution hole 29 is arranged closer to the inlets 27a of the in-wall flow paths 27 in the second flow path group 27G than to the outlets 27b. At and around the inlets 27a of the in-wall flow paths 27, the plate material 25 has low metal temperatures and small stresses because those portions are cooled by the relatively low-temperature compressed air "a" which has just flowed into the in-wall flow paths 27. By installing the dilution holes 29 at those positions, stress concentration at and around the dilution holes 29 can be reduced, and the risk in terms of strength accompanying the installation of the dilution holes 29 can be reduced. In addition, the compressed air "a" flowing through the dilution holes 29 can also contribute to cooling of the transition piece 23.

(3) If the number of dilution holes 29 is reduced, and their opening area sizes are increased by a corresponding amount, the dilution holes 29 interfere with the in-wall flow paths 27. However, in the present embodiment, the number of dilution holes 29 is substantially the same as the number of in-wall flow paths 27 that are present in a large amount, and the opening area sizes of the individual dilution holes 29 are kept small. Interference between the dilution holes 29 and the in-wall flow paths 27 can thus be avoided, the cooling effect intended for the in-wall flow paths 27 is not inhibited. Additionally, since a large number of small-diameter dilution holes 29 form an annular line, a film cooling membrane (cooling air layer) that covers the inner wall of the transition piece 23 can be formed. The compressed air "a" which is caused to pass through the dilution holes 29 for the purpose of enhancing the combustion stability by bypassing the burner 22 doubles as film-cooling air, and can also contribute to protection of the transition piece 23 from heat of the combustion gas "g."

(4) In terms of preventing part of the compressed air "a" to be caused to bypass the burner 22 and merge with the combustion gas "g" from influencing combustion reactions of flames, it is advantageous to arrange the dilution holes 29 closer to the gas turbine 30. However, if the distances between the gas turbine 30 and the dilution holes 29 are excessively short, the compressed air "a" having a large temperature difference from the combustion gas "g" is not mixed sufficiently with the combustion gas "g," the combustion gas "g" flows into the gas turbine 30 in a state in which its temperature distribution is not uniform, and stresses of the gas turbine 30 can increase.

In view of this, in the present embodiment, it is ensured that the compressed air "a" having spouted out from the dilution holes 29 installed between the in-wall flow paths 27 is given a distance for being mixed with the combustion gas "g," which distance is equal to the length of the first flow path group 26G, before the compressed air "a" is supplied to the gas turbine 30. Accordingly, the compressed air "a" having spouted out from the dilution holes 29 to the combustion gas flow path 23a can be mixed sufficiently with the combustion gas "g," so that the temperature distribution of the combustion gas "g" can be made uniform, and stress increases of the gas turbine 30 can be reduced.

Second Embodiment

Figure 11:
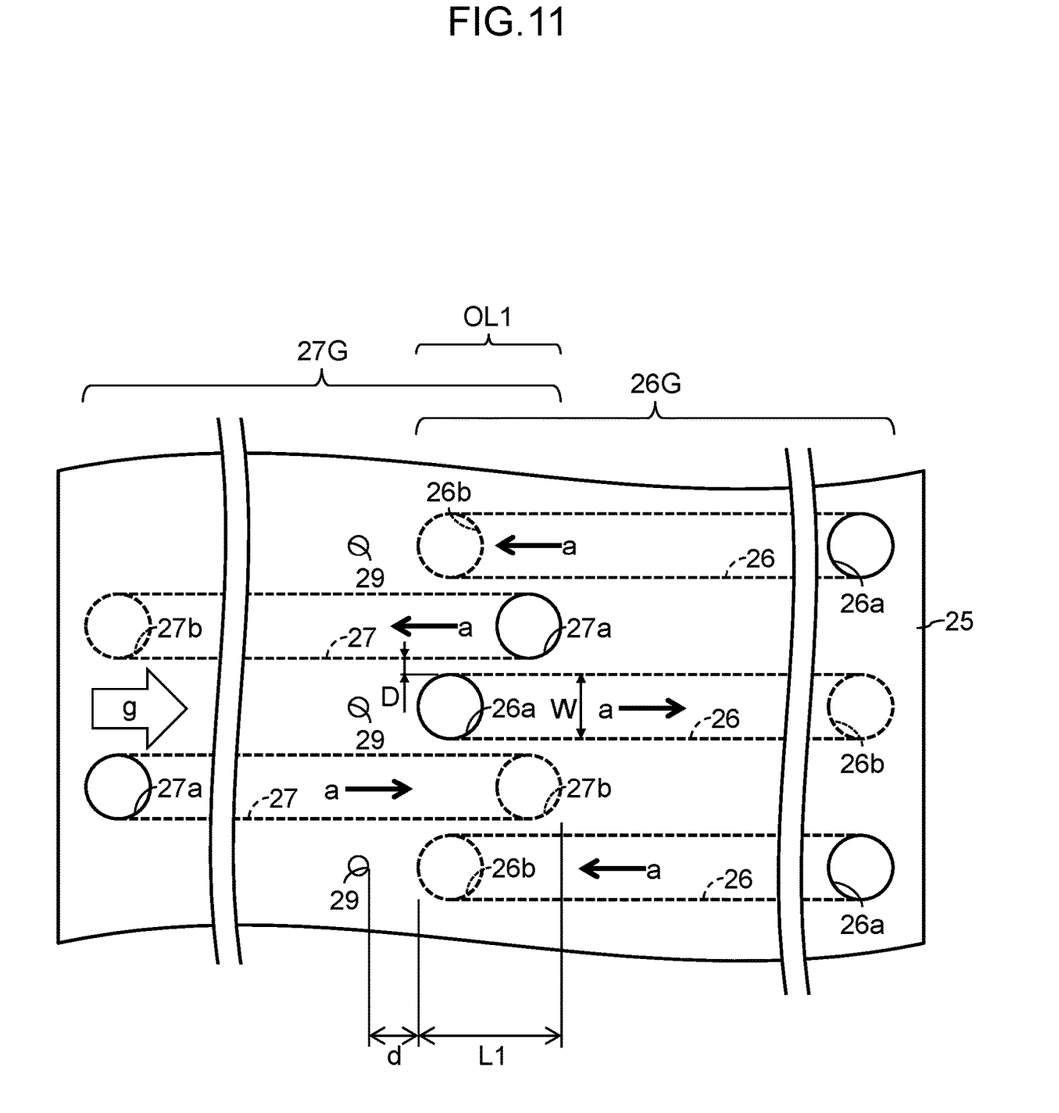
FIG. 11 is a figure schematically depicting part of the outer circumferential surface of the transition piece according to a second embodiment of the present invention.

FIG. 11 is a figure schematically depicting part of the outer circumferential surface of the transition piece according to a second embodiment of the present invention and is a figure corresponding to FIG. 4 of the first embodiment. Elements in FIG. 11 that are identical to or corresponding to their counterparts in the first embodiment are given the same reference characters as those in the first embodiment, and explanations thereof are omitted.

A difference from the first embodiment is that, in the configuration in the present embodiment, the flow directions of the compressed air "a" through in-wall flow paths that are in each of the first flow path group 26G to the third flow path group 28G and are adjacent to each other in the circumferential direction of the transition piece 23 are opposite to each other. Specifically, in-wall flow paths 26 that are in the first flow path group 26G and are adjacent to each other in the circumferential direction of the transition piece 23 have the inlets 26a and the outlets 26b at mutually opposite ends. The first and third in-wall flow paths 26 from an upper side in FIG. 11 have the inlets 26a that are positioned on the gas-turbine side and the outlets 26b that are positioned on the combustor-liner side. Meanwhile, the second in-wall flow path 26 between them has the inlet 26a that is positioned on the combustor-liner side and the outlet 26b that is positioned on the gas-turbine side. Similarly, the upper in-wall flow path 27 has the inlet 27a that is positioned on the gas-turbine side and the outlet 27b that is positioned on the combustor-liner side. Meanwhile, the lower in-wall flow path 27 has the inlet 27a that is positioned on the combustor-liner side and the outlet 27b that is positioned on the gas-turbine side. Although not depicted, the same applies also to the in-wall flow paths 28 in the third flow path group 28G.

In other respects, the present embodiment has a configuration similar to that of the first embodiment.

In addition to effects similar to those in the first embodiment, in the present embodiment, adjacent in-wall flow paths in each of the first flow path group 26G to the third flow path group 28G have mutually opposite flow directions of the compressed air "a", so that there is an advantage of making it unlikely that temperature gradients themselves, which are a cause of stresses, are generated.

Third Embodiment

Figure 12:
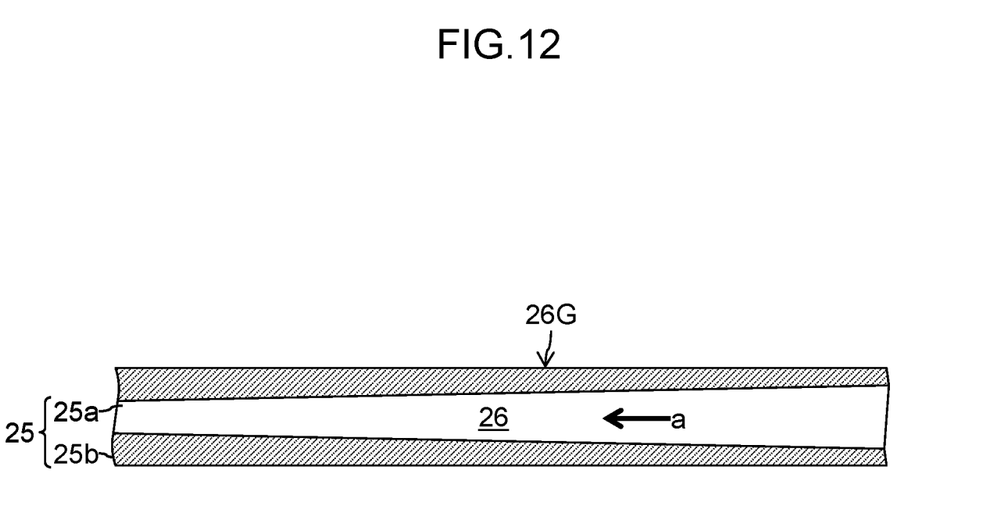
FIG. 12 is a cross-sectional view of a plate material of the transition piece according to one configuration example in a third embodiment of the present invention.
Figure 13:
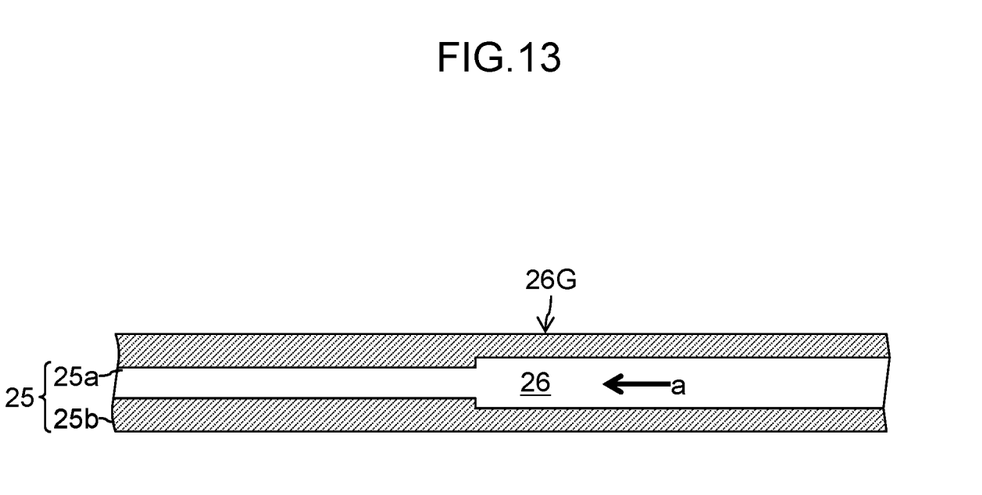
FIG. 13 is a cross-sectional view of the plate material of the transition piece according to another configuration example in the third embodiment of the present invention.

FIG. 12 and FIG. 13 are cross-sectional views of the plate material of the transition piece according to a third embodiment of the present invention. Elements in FIG. 12 and FIG. 13 that are identical to or corresponding to their counterparts in the first and second embodiments are given the same reference characters as those in the first and second embodiments, and explanations thereof are omitted.

A difference from the first and second embodiments is that, in the present embodiment, in at least one flow path group in the first flow path group 26G to the third flow path group 28G, flow-path cross-sectional area sizes on the side closer to the outlets of in-wall flow paths are made smaller than flow-path cross-sectional area sizes on the side closer to the inlets of the in-wall flow paths. In an example depicted in FIG. 12, each in-wall flow path 26 in the first flow path group 26G is formed in a conical shape, and the flow-path cross-sectional area size decreases continuously from the inlet toward the outlet. In an example depicted in FIG. 13, a step is provided on the inner wall of each in-wall flow path 26 in the first flow path group 26G, and the flow-path cross-sectional area size of a portion on the outlet side decreases stepwise relative to a portion on the inlet side. While the in-wall flow paths 26 in the first flow path group 26G are illustrated as examples of application subjects in the examples in FIG. 12 and FIG. 13, similar configurations can be applied also to the in-wall flow paths 27 in the second flow path group 27G and the in-wall flow paths 28 in the third flow path group 28G. It is sufficient if the outlets of the in-wall flow paths are smaller than their inlets in at least one flow path group of the first flow path group 26G, the second flow path group 27G, and the third flow path group 28G.

In other respects, the present embodiment has a configuration similar to that of the first or second embodiment.

In addition to effects similar to those in the first or second embodiment, according to the present embodiment, an effect of reducing temperature gradients of the plate material 25 can be expected due to adjustment of flow rates of the compressed air "a" flowing through in-wall flow paths. That is, while the compressed air "a" flowing through each in-wall flow path is heated as it approaches the outlet of the in-wall flow path, the flow rate of the compressed air "a" having a relatively high temperature increases with respect to that of the compressed air "a" having a relatively low temperature in each in-wall flow path in the present embodiment. Accordingly, the rate of heat transfer to the plate material 25 from the compressed air "a" flowing through the in-wall flow path is adjusted, and generation of temperature gradients in the plate material 25 can be reduced.

Modification Examples

While the flow direction of the compressed air "a" flowing through each in-wall flow path is made a direction opposite to the flow of the combustion gas "g" flowing through the combustion gas flow path 23a in the configuration in the first embodiment, the flow direction of the compressed air "a" in each in-wall flow path may be made the same as the flow direction of the combustion gas "g."

In addition, while three flow path groups, which are the first flow path group 26G to the third flow path group 28G, are provided in the transition piece 23 in the configuration illustrated as an example in the present embodiment, the area of the transition piece 23 may otherwise be divided into two, and two flow path groups may be provided. Alternatively, the area of the transition piece 23 may be divided into four or more, and four or more flow path groups may be provided. When there are two flow path groups, there is one overlap section, but the essential effect (1) described above can be attained if the overlap amount changes according to the magnitude of the shape change of the transition piece 23 depending on the circumferential position.

While an annular line of dilution holes 29 along the overlap section OL1 is provided in the configuration explained as an example, instead of this or in addition to this, an annular line of dilution holes 29 along the overlap section OL2 may be provided. Further, if not necessary, dilution holes 29 may be omitted.

Each of in-wall flow paths 26 to 28 may share an inlet or an outlet with an adjacent in-wall flow path. That is, an inlet or an outlet may be expanded or formed as a long hole which is long in the circumferential direction, and the one inlet or outlet may communicate with a plurality of in-wall flow paths.

While the slitted outer plate 25a is pasted together with the inner plate 25b of the plate material 25 to form the in-wall flow paths 26 to 28 in the example explained, the method of forming the in-wall flow paths 26 to 28 can be changed as appropriate.

DESCRIPTION OF REFERENCE CHARACTERS

10: Compressor
20: Combustor
21: Combustor liner
23: Transition piece

23a: Combustion gas flow path
25: Plate material
26 to 28: In-wall flow path
26a, 27a, 28a: Inlet
26b, 27b, 28b: Outlet
26G: First flow path group
27G: Second flow path group
28G: Third flow path group
30: Gas turbine
101a: Compressed air main flow path
100: Gas turbine engine
a: Compressed air
g: Combustion gas
L1, L2: Overlap amount

What is claimed is:

1. A transition piece provided to a combustor that supplies a gas turbine with a combustion gas generated by combusting inside a combustor liner a fuel together with compressed air compressed in a compressor of a gas turbine engine, the transition piece connecting the combustor liner and the gas turbine and being formed of a plate material in a tubular form in such a manner that the transition piece separates an outer compressed air main flow path that supplies the compressed air from the compressor to the combustor and an inner combustion gas flow path that supplies the combustion gas from the combustor liner to the gas turbine from each other, the transition piece comprising:
   a first flow path group that is formed by arraying in a circumferential direction of the transition piece a plurality of in-wall flow paths that extend inside the plate material from a side closer to the gas turbine to a side closer to the combustor liner; and
   a second flow path group that is positioned on a side closer to the combustor liner than the first flow path group is and that is formed by arraying in the circumferential direction of the transition piece a plurality of in-wall flow paths that extend inside the plate material from the side closer to the gas turbine to the side closer to the combustor liner, wherein
   each in-wall flow path in the first flow path group and the second flow path group has an inlet that is located at one end section in a flow direction of the combustion gas and that faces the compressed air main flow path, and an outlet that is located at another end section in the flow direction of the combustion gas and that faces the combustion gas flow path,
   an installation area of the first flow path group and an installation area of the second flow path group partially overlap in the flow direction of the combustion gas by a predetermined overlap amount, and
   the predetermined overlap amount is set larger for a portion where a shape change of the transition piece is relatively large, as compared with a portion where the shape change of the transition piece is relatively small,
   wherein the shape change is a curvature of the plate material, a cross-sectional area size change rate of the transition piece, or a width change rate of the transition piece.

2. The transition piece according to claim 1, wherein the predetermined overlap amount is made different partially depending on a circumferential position of the transition piece.

3. The transition piece according to claim 1, further comprising:
   a third flow path group that is positioned on a side closer to the combustor liner than the second flow path group is, and is formed by arraying in the circumferential direction of the transition piece a plurality of in-wall flow paths that extend inside the plate material from a downstream side closer to the gas turbine to an upstream side closer to the combustor liner, wherein the installation area of the second flow path group and an installation area of the third flow path group partially overlap in the flow direction of the combustion gas by a predetermined overlap amount, and the predetermined overlap amount of the second flow path group and the third flow path group is made different partially depending on a circumferential position of the transition piece.

4. The transition piece according to claim 1, wherein adjacent in-wall flow paths in each of the first flow path group and the second flow path group are configured in such a manner that flow directions of the compressed air therethrough become opposite to each other.

5. The transition piece according to claim 1, wherein each in-wall flow path in the first flow path group and the second flow path group is configured in such a manner that the compressed air is caused to pass therethrough in a direction opposite to the flow direction of the combustion gas, and each in-wall flow path of at least one of the first flow path group and the second flow path group has a smaller flow-path cross-sectional area size on a side closer to the outlet than a flow-path cross-sectional area size on a side closer to the inlet.

6. A combustor comprising the transition piece according to claim 1.

7. A gas turbine engine comprising:

a compressor that compresses air to generate compressed air;

the combustor according to claim 6 that generates a combustion gas by combusting a fuel together with the compressed air delivered from the compressor; and a gas turbine that is driven by the combustion gas supplied from the combustor.

* * * * *